US012779438B2

(12) United States Patent
Fecant et al.

(10) Patent No.: US 12,779,438 B2
(45) Date of Patent: Nov. 3, 2026

(54) CATALYST CONTAINING PHOSPHORUS AND SODIUM AND USE THEREOF IN A HYDRODESULFURIZATION PROCESS

(71) Applicant: IFP Energies nouvelles, Rueil-Malmaison (FR)

(72) Inventors: Antoine Fecant, Rueil-Malmaison Cedex (FR); Etienne Girard, Rueil-Malmaison Cedex (FR); Philibert Leflaive, Rueil-Malmaison Cedex (FR)

(73) Assignee: IFP Energies nouvelles, Rueil-Malmaison (FR)

( * ) Notice: Subject to any disclaimer, the term of this patent is extended or adjusted under 35 U.S.C. 154(b) by 484 days.

(21) Appl. No.: 18/286,642

(22) PCT Filed: Apr. 15, 2022

(86) PCT No.: PCT/EP2022/060158
§ 371 (c)(1),
(2) Date: Oct. 12, 2023

(87) PCT Pub. No.: WO2022/223482
PCT Pub. Date: Oct. 27, 2022

(65) Prior Publication Data

US 2024/0216896 A1 Jul. 4, 2024

(30) Foreign Application Priority Data

Apr. 21, 2021 (FR) ........................................ 2104145

(51) Int. Cl.

| | |
|---|---|
| ***B01J 23/887*** | (2006.01) |
| ***B01J 35/40*** | (2024.01) |
| ***B01J 35/61*** | (2024.01) |
| ***B01J 35/63*** | (2024.01) |
| ***C10G 45/08*** | (2006.01) |
| ***C10G 45/22*** | (2006.01) |

(52) U.S. Cl.
CPC ......... *B01J 23/8872* (2013.01); *B01J 35/613* (2024.01); *B01J 35/615* (2024.01); *B01J 35/635* (2024.01); *B01J 35/638* (2024.01); *C10G 45/08* (2013.01); *C10G 45/22* (2013.01); *B01J 35/40* (2024.01); *C10G 2300/10* (2013.01); *C10G 2300/70* (2013.01); *C10G 2400/02* (2013.01)

(58) Field of Classification Search
CPC .... B01J 23/8872; B01J 35/613; B01J 35/615; B01J 35/635; B01J 35/638; B01J 35/40; C10G 45/08; C10G 45/22; C10G 2300/10; C10G 2300/70; C10G 2400/02
USPC ............. 502/211, 213, 214, 313; 208/216 R, 208/216 PP, 217
See application file for complete search history.

(56) References Cited

U.S. PATENT DOCUMENTS

| | | | |
|---|---|---|---|
| 3,494,857 | A | 2/1970 | Mcilvried et al. |
| 5,266,188 | A | 11/1993 | Kukes et al. |
| 9,931,617 | B2 | 4/2018 | Daudin et al. |
| 2006/0213814 | A1 | 9/2006 | Romero et al. |
| 2010/0219102 | A1 | 9/2010 | Hatanaka et al. |

FOREIGN PATENT DOCUMENTS

| | | | |
|---|---|---|---|
| EP | 0586196 | A1 | 3/1994 |
| FR | 2998488 | A1 | 5/2014 |

OTHER PUBLICATIONS

English translation of Written Opinion for PCT/EP2022/060158, (Year: 2021).*
International Search report PCT/EP2022/060158 dated Aug. 10, 2022 (pp. 1-2).

* cited by examiner

*Primary Examiner* — Patricia L. Hailey
(74) *Attorney, Agent, or Firm* — Millen, White, Zelano & Branigan, PC; Brion P. Heaney

(57) ABSTRACT

Catalyst comprising an active phase based on at least one group VIB metal, at least one group VIII metal, phosphorus, sodium and an alumina-based support, the sodium content being between 50 and 2000 ppm by weight in the form of Na—O relative to the total weight of said catalyst, and the molar ratio of phosphorus to sodium being between 1.5 and 300.

20 Claims, No Drawings

CATALYST CONTAINING PHOSPHORUS AND SODIUM AND USE THEREOF IN A HYDRODESULFURIZATION PROCESS

TECHNICAL FIELD

The present invention relates to the field of the hydrotreating of gasoline cuts, notably gasoline cuts resulting from fluidized-bed catalytic cracking units. More particularly, the present invention relates to a catalyst and to the use thereof in a process for hydrodesulfurization of an olefinic gasoline cut containing sulfur, such as the gasolines resulting from catalytic cracking, for which it is sought to reduce the content of sulfur-bearing compounds, without hydrogenating the olefins and the aromatics.

STATE OF THE ART

Petroleum refining and also petrochemistry are now subject to new constraints. This is because all countries are gradually adopting strict sulfur specifications, the objective being to achieve, for example, 10 ppm (by weight) of sulfur in commercial gasolines in Europe and in Japan. The problem of reducing sulfur contents is essentially focused on gasolines obtained by cracking, whether catalytic (FCC, Fluid Catalytic Cracking) or non-catalytic (coking, visbreaking, steam cracking), the main precursors of sulfur in gasoline pools.

One solution, well known to those skilled in the art, for reducing the sulfur content consists in carrying out a hydrotreating (or hydrodesulfurization) of the hydrocarbon cuts (and notably of catalytic cracking gasolines) in the presence of hydrogen and of a heterogeneous catalyst. However, this process exhibits the major disadvantage of causing a very significant drop in the octane number if the catalyst employed is not sufficiently selective. This reduction in the octane number is notably linked to the hydrogenation of the olefins present in this type of gasoline concomitantly with the hydrodesulfurization. Unlike other hydrotreating processes, the hydrodesulfurization of gasolines thus has to make it possible to respond to a double antagonistic constraint: to provide extreme hydrodesulfurization of the gasolines and to limit the hydrogenation of the unsaturated compounds present.

One way for confronting this twofold problem consists in employing hydrodesulfurization catalysts which are both active in hydrodesulfurization and also very selective for hydrodesulfurization relative to the olefin hydrogenation reaction.

Thus, document EP0736589 is known from the prior art and discloses a process for the hydrodesulfurization of an olefinic gasoline cut containing sulfur implemented in the presence of a catalyst comprising an active phase based on at least one group VIB metal and at least one group VIII metal on an alumina-type support, said support additionally containing an alkali metal in a content range of between 0.2 and 3% by weight relative to the support. The support may also comprise another compound chosen from boron, phosphorus and silicon, although the contents thereof are not disclosed.

Document U.S. Pat. No. 5,266,188 describes the use in a selective desulfurization process of catalysts comprising an active phase based on at least one group VIB metal and at least one group VIII metal and a support simultaneously comprising between 0.5 and 50% by weight of magnesium and between 0.02 and 10% by weight of an alkali metal, relative to the total weight of the catalyst. However, this document does not disclose the presence of phosphorus in the catalyst.

Furthermore, document US2010/219102 discloses a process for producing a gasoline cut in the presence of a catalyst containing one or more metals from cobalt, molybdenum, nickel and tungsten, on an alumina-based oxide support and additionally containing another metal chosen from alkali metals, iron, chromium, cobalt, nickel, copper, zinc, yttrium, scandium and lanthanides. The alkali metal is preferably potassium. However, this document does not disclose the presence of phosphorus in the catalyst.

Document U.S. Pat. No. 3,494,857 discloses a process for the hydrogenation of a liquid fraction containing unsaturated compounds in the presence of a catalyst comprising a group VIII metal and optionally a group VIB metal deposited on an alumina-type or silica-alumina-type support promoted by an alkali metal with a content of between 0.1 and 5% by weight, preferably between 0.4 and 2.5% by weight. However, this document does not disclose the presence of phosphorus in the catalyst.

Finally, document US2006/213814 discloses a process for the hydrodesulfurization of a naphtha cut in the presence of a catalyst comprising an active phase based on a group VIB metal, preferably molybdenum, on a group VIII metal, preferably cobalt, and on a group IA or IIA metal, preferably calcium or sodium, more preferentially calcium, at a content of between 0.01 and 2% by weight, relative to the total weight of the catalyst, and an alumina-based support. However, this document does not disclose the presence of phosphorus in the catalyst.

There thus still exists today a keen interest among refiners for hydrodesulfurization catalysts, notably for the hydrodesulfurization of gasoline cuts, which have improved catalytic performance, notably in terms of catalytic activity in hydrodesulfurization and/or of selectivity, and which thus, once used, make it possible to produce a low-sulfur gasoline without severe reduction in the octane number.

In this context, one of the objectives of the present invention is to provide a catalyst and the use thereof in a process for the hydrodesulfurization of an olefinic gasoline cut containing sulfur, exhibiting activity and selectivity performance levels that are at least as good, or even better, than the catalysts known from the prior art.

Subjects of the Invention

The subject of the present invention is a catalyst comprising at least one group VIB element, at least one group VIII element, phosphorus, sodium and a support comprising alumina, the sodium content being between 50 and 2000 ppm by weight in $Na_2O$ form, relative to the total weight of said catalyst, and the molar ratio between phosphorus and sodium being between 1.5 and 300.

The applicant has surprisingly discovered that the use of a catalyst comprising at least one group VIB element, at least one group VIII element, phosphorus, sodium and a support comprising alumina, with a specific sodium content and a specific molar ratio between sodium and phosphorus makes it possible, by synergistic effect, to improve the performance in a process for the hydrodesulfurization of an olefinic gasoline cut containing sulfur, and more particularly in terms of selectivity. Indeed, without being bound by any theory, the presence of sodium in a well-determined amount added to a specific relative composition between sodium and phosphorus within the catalyst induces a modification of the interactions between the surface of the alumina support and the active phase of the catalyst and thus makes it possible to improve the performance in a gasoline hydrodesulfurization process, notably in terms of selectivity and activity.

According to one or more embodiments, the total content of group VIII element is between 0.5 and 10% by weight of oxide of said group VIII element relative to the total weight of the catalyst.

According to one or more embodiments, the content of group VIB element is between 1 and 30% by weight of oxide of said group VIB element relative to the total weight of the catalyst.

According to one or more embodiments, the phosphorus content is between 0.1 and 10% by weight of $P_2O_5$ relative to the total weight of catalyst.

According to one or more embodiments, the molar ratio between the group VIII element and the group VIB element is between 0.1 and 0.8.

According to one or more embodiments, the molar ratio between the group VIII element and the sodium, calculated on the basis of the content of the group VIII element and of the sodium content, relative to the total weight of the catalyst, is between 2 and 400.

According to one or more embodiments, the molar ratio between the group VIB element and the sodium, calculated on the basis of the content of the group VIB element and of the sodium content, relative to the total weight of the catalyst, is between 5 and 500.

According to one or more embodiments, the molar ratio between the phosphorus and the group VIB element is between 0.2 and 0.35.

According to one or more embodiments, the phosphorus content is between 0.3 and 5% by weight of $P_2O_5$ relative to the total weight of catalyst.

According to one or more embodiments, the molar ratio between the phosphorus and sodium, calculated on the basis of the phosphorus element content and the sodium element content, relative to the total weight of the catalyst, is between 2 and 100.

In one or more embodiments, the group VIII element is cobalt and the group VIB element is molybdenum.

According to one or more embodiments, the specific surface area of said catalyst is between 50 and 200 $m^2/g$.

According to one or more embodiments, the pore volume of said catalyst is between 0.5 $cm^3/g$ and 1.3 $cm^3/g$.

Another subject according to the invention relates to a process for the hydrodesulfurization of a sulfur-containing olefinic gasoline cut, wherein said gasoline cut, hydrogen and said catalyst according to the invention are brought into contact, said hydrodesulfurization process being carried out at a temperature of between 200° C. and 400° C., a total pressure of between 1 and 3 MPa, an hourly space velocity, defined as being the flow rate by volume of feedstock relative to the volume of the catalyst, of between 1 $h^{-1}$ and 10 $h^{-1}$ and a hydrogen/gasoline cut ratio by volume of between 100 and 600 Sl/l.

According to one or more embodiments, the gasoline is a gasoline resulting from a catalytic cracking unit.

DETAILED DESCRIPTION OF THE INVENTION

1. Definitions

Subsequently, the groups of chemical elements are given according to the CAS classification (CRC Handbook of Chemistry and Physics, published by CRC Press, editor-in-chief D. R. Lide, 81st edition, 2000-2001). For example, group VIII according to the CAS classification corresponds to the metals of columns 8, 9 and 10 according to the new IUPAC classification.

The BET specific surface area is measured by nitrogen physisorption according to the standard ASTM D3663-03, a method described in the work by Rouquerol F., Rouquerol J. and Singh K., "Adsorption by Powders & Porous Solids: Principles, Methodology and Applications", Academic Press, 1999.

The total pore volume is measured by mercury porosimetry according to the standard ASTM D4284-92 with a wetting angle of 140°, for example using an Autopore® III model device of the Micromeritics® brand.

The contents of group VIII, group VIB and group V elements are measured by X-ray fluorescence and by inductively coupled plasma spectrometry (ICP) for sodium. 15

2. Description

Catalyst

The catalyst according to the invention comprises at least one group VIB element, at least one group VIII element, phosphorus, sodium and a support comprising alumina, the sodium content being between 50 and 2000 ppm by weight, measured in $Na_2O$ oxide form, relative to the total weight of said catalyst, and the molar ratio between the phosphorus and sodium, calculated on the basis of the phosphorus content and the sodium content, relative to the total weight of the catalyst, being between 1.5 and 300.

The catalyst according to the invention comprises between 50 and 2000 ppm by weight of sodium, measured in the $Na_2O$ oxide form, relative to the total weight of the catalyst, preferably between 100 and 1500 ppm by weight, and even more preferentially between 100 and 1000 ppm by weight, and even more preferentially between 150 and 950 ppm by weight.

The group VIB element is preferentially chosen from molybdenum and tungsten, more preferentially molybdenum. The group VIII element is preferentially chosen from cobalt, nickel and the mixture of these two elements, more preferentially cobalt.

The total content of group VIII element is generally between 0.5 and 10% by weight of oxide of the group VIII element relative to the total weight of the catalyst, preferably between 0.8 and 9% by weight, very preferably between 0.9 and 6% by weight of oxide of the group VIII element, relative to the total weight of the catalyst. When the element is cobalt or nickel, the element content is expressed as CoO or NiO, respectively.

The group VIB element content is generally between 1 and 30% by weight of oxide of the group VIB element relative to the total weight of the catalyst, preferably between 2 and 20% by weight, very preferably between 4 and 15% by weight of oxide of the group VIB element, relative to the total weight of the catalyst. When the element is molybdenum or tungsten, the metal content is expressed as $MoO_3$ or $WO_3$, respectively.

The contents of group VIB element, of group VIII element, of phosphorus and of sodium in the catalyst are expressed as oxides after correction for the loss on ignition of the catalyst sample at 550° C. in a muffle furnace for two hours. The loss on ignition is due to the loss of moisture. It is determined according to ASTM D7348.

The phosphorus content is preferably between 0.1 and 10% by weight of $P_2O_5$ relative to the total weight of catalyst, preferably between 0.3 and 5% by weight, and even more preferentially between 0.5 and 3% by weight of $P_2O_5$ relative to the total weight of catalyst.

The molar ratio between the phosphorus and sodium in the catalyst is between 1.5 and 300, preferably between 2 and 100, very preferably between 3 and 80, more preferentially between 4 and 60.

The molar ratio between the group VIII element and the sodium in the catalyst is advantageously between 2 and 400, preferably between 2 and 300, very preferably between 3 and 250. The molar ratio is calculated on the basis of the group VIII element content and the Na content relative to the total weight of the catalyst.

The molar ratio between the group VIB element and the sodium in the catalyst is advantageously between 5 and 500, preferably between 5 and 400, very preferably between 5 and 250. The molar ratio is calculated on the basis of the group VIB element content and the Na content relative to the total weight of the catalyst.

Preferably, the molar ratio between the group VIII element and the group VIB element of the catalyst is between 0.1 and 0.8, preferably between 0.2 and 0.6, preferably between 0.3 and 0.5 and even more preferably between 0.35 and 0.45.

Preferably, the molar ratio between the phosphorus and the group VIB element is between 0.2 and 0.35, preferably between 0.23 and 0.35 and even more preferably between 0.25 and 0.35.

The catalyst generally comprises a specific surface area of between 50 and 200 $m^2/g$, preferably between 60 and 190 $m^2/g$ and preferably between 60 and 170 $m^2/g$.

The pore volume of the catalyst is generally between 0.5 $cm^3/g$ and 1.3 $cm^3/g$, preferably between 0.6 $cm^3/g$ and 1.1 $cm^3/g$.

Alumina Support

The support of the catalyst according to the invention comprises alumina. Preferably, the support consists of alumina.

In one embodiment according to the invention, the presence of sodium in the catalyst comes from the presence of sodium in the support. In this embodiment, the sodium content is preferably between 50 and 2500 ppm by weight of sodium, measured in its $Na_2O$ oxide form, relative to the total weight of the support, preferably between 50 and 2000 ppm by weight, and even more preferentially between 100 and 1500 ppm by weight.

The pore volume of the support is generally between 0.5 $cm^3/g$ and 1.3 $cm^3/g$, preferably between 0.65 $cm^3/g$ and 1.2 $cm^3/g$.

The support generally comprises a specific surface area of between 50 and 200 $m^2/g$, preferably between 60 and 190 $m^2/g$.

The support can be in the form of balls, extrudates of any geometry, powder, platelets, pellets, a compressed cylinder, crushed solids or any other shaping. Preferably, the support is in the form of beads with a diameter of 0.5 to 6 mm or in the form of cylindrical, trilobe or quadrilobe extrudates with a circumscribed diameter of 0.8 to 3 mm.

The support of the catalyst according to the invention can be synthesized by various methods known to those skilled in the art, for example by rapid dehydration of a precursor of aluminum trihydroxide ($Al(OH)_3$) type (otherwise known as hydrargillite or gibbsite) for example from the process commonly called "Bayer". A shaping is then carried out, for example by granulation, then a hydrothermal treatment and finally a calcination which leads to the obtaining of alumina. This method is notably described in detail in the document by P. Euzen, P. Raybaud, X. Krokidis, H. Toulhoat, J. L. Le Loarer, J. P. Jolivet and C. Froidefond, Alumina, in Handbook of Porous Solids, edited by F. Schuth, K. S. W. Sing and J. Weitkamp, Wiley-VCH, Weinheim, Germany, 2002, pp. 1591-1677. This method makes it possible to produce an alumina commonly called "flash alumina".

When sodium is present in the alumina support, the sodium is generally introduced during or after the synthesis of the alumina. More particularly, the sodium present in the support may already be present in the aluminic precursors, for example in the precursor of aluminum hydroxide type. The sodium present in the alumina support can also be introduced in the desired amount into the support either during the shaping of the support, for example during the granulation step in the synthesis of a flash alumina or even by impregnation of the aluminic precursor.

Process for the Preparation of the Catalyst

The introduction of the active phase onto the support can be carried out according to any method of preparation known to those skilled in the art. The addition of the active phase to the support consists in bringing at least one component of a group VIB element, at least one component of a group VIII element, phosphorus and optionally sodium into contact with the support, so as to obtain a catalyst precursor.

According to a first mode of implementation, said components of the group VIB element and of the group VIII element, phosphorus and optionally sodium are deposited onto said support by one or more coimpregnation steps, that is to say that said components of the group VIB element and of the group VIII element, phosphorus and optionally sodium are introduced simultaneously into said support. The coimpregnation step(s) is (are) preferentially carried out by dry impregnation or by excess impregnation of solution. When this first embodiment comprises the implementation of several coimpregnation steps, each coimpregnation step is preferably followed by a step of intermediate drying, generally at a temperature of less than 200° C., advantageously of between 50° C. and 180° C., preferably between 60° C. and 150° C., very preferably between 75° C. and 140° C., generally for a period of time of 0.5 to 24 hours, preferably of 0.5 to 12 hours.

According to a preferred embodiment by coimpregnation, the impregnation solution is preferably an aqueous solution. Preferably, the aqueous impregnation solution, when it contains cobalt, molybdenum and phosphorus, is prepared under pH conditions which promote the formation of heteropolyanions in solution. For example, the pH of such an aqueous solution is between 1 and 5.

According to a second embodiment, the catalyst precursor is prepared by carrying out the successive depositions, in any order, of a component of a group VIB element, of a component of a group VIII element and of phosphorus and optionally sodium onto said support. The depositions may be carried out by dry impregnation, by excess impregnation or else by deposition-precipitation, according to methods well known to those skilled in the art. In this second embodiment, the deposition of the components of the group VIB and group VIII metals and of phosphorus and obviously sodium can be carried out by several impregnations with a step of intermediate drying between two successive impregnations, generally at a temperature of less than 200° C., advantageously of between 50° C. and 180° C., preferably between 60° C. and 150° C., very preferably between 75° C. and 140° C., generally for a period of time of 0.5 to 24 hours, preferably of 0.5 to 12 hours.

Whatever the mode of deposition of the elements, of phosphorus and optionally of sodium used, the solvent which forms part of the composition of the impregnation solutions is chosen so as to solubilize the metal precursors of the active phase, such as water or an organic solvent (for example an alcohol).

Use may be made, by way of example, among the sources of molybdenum, of the oxides and hydroxides, molybdic acids and salts thereof, in particular the ammonium salts, such as ammonium molybdate, ammonium heptamolybdate, phosphomolybdic acid ($H_3PMO_{12}O_{40}$), and salts thereof, and optionally silicomolybdic acid ($H_4SiMo_{12}O_{40}$) and salts thereof. The sources of molybdenum can also be any heteropolycompound of Keggin, lacunary Keggin, substituted Keggin, Dawson, Anderson or Strandberg type, for example. Use is preferably made of molybdenum trioxide and the heteropolycompounds of Keggin, lacunary Keggin, substituted Keggin and Strandberg type.

The tungsten precursors which can be used are also well known to those skilled in the art. For example, use may be made, among the sources of tungsten, of the oxides and hydroxides, tungstic acids and salts, in particular the ammonium salts, thereof, such as ammonium tungstate or ammonium metatungstate, phosphotungstic acid and salts thereof, and optionally silicotungstic acid ($H_4SiW_{12}O_{40}$) and its salts. The sources of tungsten can also be any heteropolycompound of Keggin, lacunary Keggin, substituted Keggin or Dawson type, for example. Use is preferably made of the oxides and the ammonium salts, such as ammonium metatungstate, or the heteropolyanions of Keggin, lacunary Keggin or substituted Keggin type.

The cobalt precursors which can be used are advantageously chosen from the oxides, hydroxides, hydroxycarbonates, carbonates and nitrates, for example. Use is preferably made of cobalt hydroxide and cobalt carbonate.

The nickel precursors which can be used are advantageously chosen from the oxides, hydroxides, hydroxycarbonates, carbonates and nitrates, for example. Use is preferably made of nickel hydroxide and nickel hydroxycarbonate.

The phosphorus can advantageously be introduced into the catalyst at various steps of its preparation and in various ways. The phosphorus can be introduced during the shaping of said alumina support, or preferably after this shaping. It can advantageously be introduced alone or as a mixture with at least one of the group VIB and VIII metals. The phosphorus is preferably introduced as a mixture with the precursors of the metals from group VIB and from group VIII, completely or partially onto the shaped alumina support, by dry impregnation of said alumina support using a solution containing the precursors of the metals and the precursor of the phosphorus. The preferred source of phosphorus is orthophosphoric acid $H_3PO_4$, but its salts and esters, such as ammonium phosphates or mixtures thereof, are also suitable. The phosphorus can also be introduced at the same time as the element(s) from group VIB in the form, for example, of Keggin, lacunary Keggin, substituted Keggin or Strandberg-type heteropolyanions.

In an embodiment variant according to the invention, wherein sodium is added during the introduction of the active phase onto the support, the sodium can advantageously be introduced into the catalyst at various stages of its preparation and in various ways. It can advantageously be introduced alone or as a mixture with at least one of the group VIB and group VIII elements and phosphorus. Any source of sodium known to those skilled in the art can be used. Preferably, the source of sodium is sodium nitrate, sodium chloride, sodium hydroxide, or even sodium sulfate.

At the end of the step or steps of bringing the group VIII and group VIB elements, phosphorus and optionally sodium into contact with the support, the precursor of the catalyst is subjected to a drying step carried out by any technique known to those skilled in the art. It is advantageously carried out at atmospheric pressure or at reduced pressure. Preferably, this step is carried out at atmospheric pressure. This step is carried out at a temperature below 200° C., preferably between 50° C. and 180° C., preferably between 60° C. and 150° C. and very preferably between 75° C. and 140° C.

The drying step is advantageously carried out in a traversed bed using hot air or any other hot gas. Preferably, when the drying is carried out in a traversed bed, the gas used is either air or an inert gas, such as argon or nitrogen. Very preferably, the drying is carried out in a traversed bed in the presence of air.

Preferably, this drying step has a duration of between 30 minutes and 24 hours and preferably of between 1 hour and 12 hours.

On conclusion of the drying step, a dried catalyst is obtained which can be used as hydrotreating catalyst after an activation phase (sulfidation step).

According to an alternative form, the dried catalyst can be subjected to a subsequent calcination step, for example under air, at a temperature of greater than or equal to 200° C. The calcination is generally carried out at a temperature of less than or equal to 600° C., preferably of between 200° C. and 600° C. and particularly preferably of between 250° C. and 500° C. The calcination time is generally of between 0.5 hour and 16 hours, preferably between 1 hour and 6 hours. It is generally carried out under air. Calcination makes it possible notably to transform the precursors of the elements of groups VIB and VIII into oxides.

Before its use as hydrotreating catalyst, it is advantageous to subject the dried or optionally calcined catalyst to a sulfidation step (activation phase). This activation phase is carried out by methods well known to those skilled in the art, and advantageously under a sulfo-reductive atmosphere in the presence of hydrogen and of hydrogen sulfide. The hydrogen sulfide can be used directly or generated by a sulfide agent (such as dimethyl disulfide).

Process for the Hydrodesulfurization of Gasoline

The hydrotreating process consists in bringing the sulfur-containing olefinic gasoline cut into contact with a catalyst as described above and hydrogen under the following conditions:

- a temperature of between 200° C. and 400° C., preferably of between 230° C. and 330° C.;
- at a total pressure of between 1 and 3 MPa, preferably of between 1.5 and 2.5 MPa;
- an hourly space velocity (HSV), defined as being the volume flow rate of feedstock relative to the volume of catalyst, of between 1 and 10 $h^{-1}$, preferably of between 2 and 6 $h^{-1}$;
- a hydrogen/gasoline feedstock volume ratio of between 100 and 600 Sl/l, preferably of between 200 and 400 Sl/l.

Thus, the process according to the invention makes it possible to treat any type of sulfur-containing olefinic gasoline cut, such as, for example, a cut resulting from a coking, visbreaking, steam cracking or catalytic cracking (FCC, Fluid Catalytic Cracking) unit. This gasoline can optionally be composed of a significant fraction of gasoline originating from other production processes, such as atmospheric distillation (gasoline resulting from a direct distillation (or straight run gasoline)), or from conversion processes (coking or steam cracking gasoline). Said feedstock preferably consists of a gasoline cut resulting from a catalytic cracking unit.

The feedstock is advantageously a gasoline cut containing sulfur-comprising compounds and olefins and has a boiling point of between 30° C. and less than 250° C., preferably between 35° C. and 240° C. and in a preferred way between 40° C. and 220° C.

The sulfur content of the gasoline cuts produced by catalytic cracking (FCC) depends on the sulfur content of the feedstock treated by the FCC, on the presence or not of a pretreatment of the feedstock of the FCC, as well as on the end point of the cut. Generally, the sulfur contents of the whole of a gasoline cut, notably those originating from the FCC, are greater than 100 ppm by weight and most of the time greater than 500 ppm by weight. For gasolines having end points of greater than 200° C., the sulfur contents are often greater than 1000 ppm by weight; they can even, in certain cases, reach values of the order of 4000 to 5000 ppm by weight.

In addition, the gasolines resulting from catalytic cracking (FCC) units contain, on average, between 0.5% and 5% by weight of diolefins, between 20% and 50% by weight of olefins and between 10 ppm and 0.5% by weight of sulfur, including generally less than 300 ppm of mercaptans. The mercaptans are generally concentrated in the light fractions of the gasoline and more specifically in the fraction having a boiling point of below 120° C.

It should be noted that the sulfur compounds present in the gasoline can also comprise heterocyclic sulfur compounds, such as, for example, thiophenes, alkylthiophenes or benzothiophenes. These heterocyclic compounds, unlike mercaptans, cannot be removed by extractive processes. These sulfur compounds are consequently removed by a hydrotreating, which leads to their transformation into hydrocarbons and $H_2S$.

Preferably, the gasoline treated by the process according to the invention is a heavy gasoline (or HCN for Heavy Cracked Naphtha) resulting from a distillation step aimed at separating a broad cut of the gasoline resulting from a cracking process (or FRCN for Full Range Cracked Naphtha) into a light gasoline (LCN for Light Cracked Naphtha) and a heavy gasoline HCN. The cut point of the light gasoline and of the heavy gasoline is determined in order to limit the sulfur content of the light gasoline and to make it possible to use it in the gasoline pool, preferably without additional post-treatment. Advantageously, the broad cut FRCN is subjected to a selective hydrogenation step described below before the distillation step.

EXAMPLES

Example 1: Catalyst a (not in Accordance with the Invention)

100 grams of TH200@ alumina sold by Sasol® are calcined in a fixed traversed bed at 750° C. for 4 hours under an air flow of 1l/h/g. The support S1 thus obtained has a specific surface area of 90 $m^2$/g, a pore volume measured by mercury porosimetry of 0.60 ml/g and a loss on ignition of 2.6% by weight.

Cobalt, molybdenum and phosphorus are then added. The impregnation solution is prepared by dissolution at 90° C. of molybdenum oxide (2.25 g, purity ≥99.5%, Sigma-Aldrich™), cobalt hydroxide (0.61 g, purity 99.9%, Alfa Aesar®), phosphoric acid at 85% by weight (0.51 g, purity 99.99%, Sigma-Aldrich™) in 15.6 ml of water. After dry impregnation of 20 g of support S1, the impregnated alumina is left to mature in a water-saturated atmosphere at ambient temperature for 24 hours, and then dried at 120° C. for 16 hours. The dried catalyst thus obtained is denoted A.

The final metal composition of catalyst A, determined by X-ray fluorescence, expressed in the form of oxides and relative to the weight of the dry catalyst, is then as follows: $MoO_3$=10.0+/−0.2% by weight, CoO=2.1+/−0.1% by weight and $P_2O_5$=1.4+/−0.1% by weight. The Co/Mo and P/Mo molar ratios are respectively 0.40 and 0.28. The sodium content determined by ICP and expressed as oxide is $Na_2O$=0.002+/−0.001% by weight relative to the total weight of the catalyst. The P/Na molar ratio of catalyst A is 306. The Co/Na and Mo/Na molar ratios are 436 and 1082 respectively.

Example 2: Catalyst B (not in Accordance with the Invention)

The support S2 is obtained from the support S1 to which sodium is then added. The impregnation solution is prepared by dissolving sodium nitrate (0.3 g) at 90° C. in 18.6 ml of water. After dry impregnation of 20 grams of support S1, the impregnated alumina is left to mature in a water-saturated atmosphere for 24 hours at ambient temperature, then dried at 120° C. for 16 hours and calcined in a fixed traversed bed at 450° C. for 4 hours under an air flow of 1l/h/g. The support S2 thus obtained has a pore volume measured by mercury porosimetry of 0.60 ml/g and a loss on ignition of 1.4% by weight.

Cobalt, molybdenum and phosphorus are then added. The impregnation solution is prepared by dissolution at 90° C. of molybdenum oxide (2.28 g, purity ≥99.5%, Sigma-Aldrich™), cobalt hydroxide (0.62 g, purity 99.9%, Alfa Aesar®), phosphoric acid at 85% by weight (0.52 g, purity 99.99%, Sigma-Aldrich™) in 15.6 ml of water. After dry impregnation of 20 g of support S2, the impregnated alumina is left to mature in a water-saturated atmosphere at ambient temperature for 24 h, and then dried at 120° C. for 16 hours. The dried catalyst thus obtained is denoted B.

The final metal composition of catalyst B, determined by X-ray fluorescence, expressed in the form of oxides and relative to the weight of the dry catalyst, is then as follows: MoOs=10.0+/−0.2% by weight, CoO=2.1+/−0.1% by weight and $P_2O_5$=1.4+/−0.1% by weight. The Co/Mo and P/Mo molar ratios are respectively 0.40 and 0.28. The sodium content determined by ICP and expressed as oxide is $Na_2O$=0.45+/−0.02% by weight relative to the total weight of the catalyst. The P/Na molar ratio of catalyst B is 1.4. The Co/Na and Mo/Na molar ratios are 1.9 and 4.8 respectively.

Example 3: Catalyst C (not in Accordance with the Invention)

The alumina support S3 supplied by Axens® has a specific surface area of 95 $m^2$/g, a pore volume measured by mercury porosimetry of 0.76 ml/g and a loss on ignition of 5.0% by weight. Cobalt and molybdenum are then added. The impregnation solution is prepared by dissolving, at 90° C., ammonium heptamolybdate tetrahydrate (2.71 g, purity 99.98%, Sigma-Aldrich™) and cobalt nitrate hexahydrate (1.80 g, purity 98%, Sigma-Aldrich™), in 15.0 ml of water. After dry impregnation of 20 g of support S3, the impregnated alumina is left to mature in a water-saturated atmosphere at ambient temperature for 24 h, and then dried at 120° C. for 16 hours. The dried catalyst thus obtained is denoted C.

The final metal composition of catalyst C, determined by X-ray fluorescence, expressed in the form of oxides and relative to the weight of the dry catalyst, is then as follows: $MoO_3$=10.0+/−0.2% by weight and CoO=2.1+/−0.1% by weight. The Co/Mo and P/Mo molar ratios are respectively 0.40 and 0. The sodium content determined by ICP and expressed as oxide is $Na_2O$=0.085+/−0.005% by weight relative to the total weight of the catalyst. The P/Na molar ratio of the catalyst is 0. The Co/Na and Mo/Na molar ratios are 10 and 25 respectively.

Example 4: Catalyst D (in Accordance)

The catalyst support D is also the support S3. Cobalt, molybdenum and phosphorus are then added. The impregnation solution is prepared by dissolution at 90° C. of molybdenum oxide (2.2 g, purity ≥99.5%, Sigma-Aldrich™), cobalt hydroxide (0.60 g, purity 99.9%, Alfa Aesar®), phosphoric acid at 85% by weight (0.48 g, purity 99.99%, Sigma-Aldrich™) in 14.9 ml of water. After dry impregnation of 20 g of support S3, the impregnated alumina is left to mature in a water-saturated atmosphere at ambient temperature for 24 h, and then dried at 120° C. for 16 hours. The dried catalyst thus obtained is denoted D.

The final metal composition of catalyst D, determined by X-ray fluorescence, expressed in the form of oxides and relative to the weight of the dry catalyst, is then as follows: MoOs=10.0+/−0.2% by weight, CoO=2.1+/−0.1% by weight and $P_2O_5$=1.4+/−0.1% by weight. The Co/Mo and P/Mo molar ratios are respectively 0.40 and 0.28. The sodium content determined by ICP and expressed as oxide is $Na_2O$=0.084+/−0.005% by weight relative to the total weight of the catalyst. The P/Na molar ratio of the catalyst is 7.3. The Co/Na and Mo/Na molar ratios are 10 and 26 respectively.

Example 5: Evaluation of the Performances of Catalysts a to D Used in a Hydrodesulfurization Reactor In this example, the performances of catalysts A to D are evaluated in the hydrodesulfurization of a catalytic cracking gasoline.

A model feedstock representative of a catalytic cracking (FCC) gasoline containing 10% by weight of 2,3-dimethylbut-2-ene and 0.33% by weight of 3-methylthiophene (i.e. 1000 ppm by weight of sulfur in the feedstock) is used for the evaluation of the catalytic performance of the various catalysts. The solvent used is heptane.

The hydrodesulfurization (HDS) reaction is carried out in a fixed traversed bed reactor under a total pressure of 1.5 MPa, at 210° C., at HSV=6 $h^{-1}$ (HSV=volume flow rate of feedstock/volume of catalyst) and an $H_2$/feedstock volume ratio of 300 Sl/l, in the presence of 4 ml of catalyst. Prior to the HDS reaction, the catalyst is sulfided in situ at 350° C. for 2 hours under a flow of hydrogen containing 15 mol % of $H_2S$ at atmospheric pressure.

Each of the catalysts is placed successively in said reactor. Samples are taken at different time intervals and are analyzed by gas chromatography so as to observe the disappearance of the reactants and the formation of the products.

The catalytic performance of the catalysts is evaluated in terms of catalytic activity and of the selectivity. The hydrodesulfurization (HDS) activity is expressed from the rate constant for the HDS reaction of 3-methylthiophene (KHDS), standardized by the volume of catalyst introduced, and assuming first-order kinetics with respect to the sulfur-comprising compound. The olefin hydrogenation (HydO) activity is expressed from the rate constant for the hydrogenation reaction of 2,3-dimethylbut-2-ene, standardized by the volume of catalyst introduced, and assuming first-order kinetics with respect to the olefin.

The selectivity of the catalyst is expressed by the standardized ratio of the rate constants kHDS/kHydO. The kHDS/kHydO ratio will increase as the catalyst becomes more selective. The values obtained are standardized by taking the catalyst A as reference (relative HDS activity and relative selectivity equal to 100). The performance qualities are thus the relative HDS activity and the relative selectivity. The results are listed in table 1 below.

TABLE 1

| | Catalysts | | | |
|---|---|---|---|---|
| | A (not in accordance) | B (not in accordance) | C (not in accordance) | D (in accordance) |
| Catalyst $Na_2O$ content (ppm) | 20 | 4500 | 850 | 840 |
| P/Na molar ratio | 306 | 1.4 | 0 | 7.3 |
| Co/Na molar ratio | 436 | 1.9 | 10 | 10 |
| Mo/Na molar ratio | 1082 | 4.8 | 25 | 26 |
| Co/Mo molar ratio | 0.40 | 0.40 | 0.40 | 0.40 |
| P/Mo molar ratio | 0.28 | 0.28 | 0 | 0.28 |
| Relative activity | 100 | 82 | 114 | 130 |
| Relative selectivity | 100 | 106 | 76 | 108 |

It therefore emerges that catalyst D according to the invention exhibits better performance in terms of activity and selectivity compared to non-compliant catalysts A, B and C and therefore underlines the importance of an adjusted $Na_2O$ content in the catalyst and of the specific and optimized P/Na molar ratio in order to obtain improved performance in a gasoline hydrodesulfurization process. This improvement in selectivity of the catalysts is particularly advantageous in the case of use in a process for the hydrodesulfurization of gasoline containing olefins for which it is sought to limit as much as possible the loss of octane due to the hydrogenation of the olefins.

The invention claimed is:

1. A catalyst comprising:
- at least one group VIB element, at least one group VIII element, phosphorus, sodium and a support comprising alumina,
- the sodium content is between 150 and 950 ppm by weight of sodium, measured in $Na_2O$ oxide form, relative to the total weight of said catalyst,
- the phosphorus content is between 0.3 and 5% by weight of $P_2O_5$ relative to the total weight of catalyst,
- the molar ratio between the phosphorus and sodium, calculated on the basis of the phosphorus content and the sodium content, relative to the total weight of the catalyst, is between 1.5 and 300, and
- the specific surface area of the catalyst is between 60 $m^2/g$ and 170 $m^2/g$.

2. The catalyst as claimed in claim 1, wherein the total content of group VIII element is between 0.5 and 10% by weight of oxide of said group VIII element relative to the total weight of the catalyst.

3. The catalyst as claimed in claim 1, wherein the content of group VIB element is between 1 and 30% by weight of oxide of said group VIB element relative to the total weight of the catalyst.

4. The catalyst as claimed in claim 1, wherein the molar ratio between the group VIII element and the group VIB element is between 0.1 and 0.8.

5. The catalyst as claimed in claim 1, wherein the molar ratio between the group VIII element and the sodium, calculated on the basis of the content of group VIII element and of the sodium content, relative to the total weight of the catalyst, is between 2 and 400.

6. The catalyst as claimed in claim 1, wherein the molar ratio between the group VIB element and the sodium, calculated on the basis of the content of group VIB element and the sodium content, relative to the total weight of the catalyst, is between 5 and 500.

7. The catalyst as claimed in claim 1, wherein the molar ratio between the phosphorus and the group VIB element is between 0.2 and 0.35.

8. The catalyst as claimed in claim 1, wherein the molar ratio between phosphorus and sodium, calculated on the basis of the phosphorus content and of the sodium content, relative to the total weight of the catalyst, is between 2 and 100.

9. The catalyst as claimed in claim 1, wherein the group VIII element is cobalt and the group VIB element is molybdenum.

10. The catalyst as claimed in claim 1, wherein the pore volume of said catalyst is between 0.5 $cm^3/g$ and 1.3 $cm^3/g$.

11. A process for the hydrodesulfurization of a sulfur-containing olefinic gasoline cut, wherein said gasoline cut, hydrogen and said catalyst according to claim 1 are brought into contact, said hydrodesulfurization process being carried out at a temperature of between 200° C. and 400° C., a total pressure of between 1 and 3 MPa, an hourly space velocity, defined as being the flow rate by volume of feedstock relative to the volume of catalyst, of between 1 $h^{-1}$ and 10 $h^{-1}$ and a hydrogen/gasoline cut ratio by volume of between 100 and 600 Sl/l.

12. The process as claimed in claim 11, wherein the gasoline is a gasoline resulting from a catalytic cracking unit.

13. The catalyst as claimed in claim 1, wherein the phosphorus content is between 0.5 and 3% by weight of $P_2O_5$ relative to the total weight of catalyst.

14. The catalyst as claimed in claim 1, wherein the molar ratio between the phosphorus and sodium, calculated on the basis of the phosphorus content and the sodium content, relative to the total weight of the catalyst, is between 3 and 80.

15. The catalyst as claimed in claim 1, wherein the molar ratio between the phosphorus and sodium, calculated on the basis of the phosphorus content and the sodium content, relative to the total weight of the catalyst, is between 4 and 60.

16. The catalyst as claimed in claim 1, wherein the molar ratio between the group VIII element and the sodium, calculated on the basis of the content of group VIII element and of the sodium content, relative to the total weight of the catalyst, is between 2 and 300.

17. The catalyst as claimed in claim 1, wherein the molar ratio between the group VIB element and the sodium, calculated on the basis of the content of group VIB element and the sodium content, relative to the total weight of the catalyst, is between 5 and 400.

18. The catalyst as claimed in claim 1, wherein the molar ratio between the group VIII element and the group VIB element is between 0.2 and 0.6.

19. The catalyst as claimed in claim 1, wherein the molar ratio between the phosphorus and the group VIB element is between 0.23 and 0.35.

20. The catalyst as claimed in claim 1, wherein the pore volume of said catalyst is between 0.6 $cm^3/g$ and 1.1 $cm^3/g$.

* * * * *